USO09442352B2

United States Patent
Nishimori et al.

(10) Patent No.: US 9,442,352 B2
(45) Date of Patent: Sep. 13, 2016

(54) LIGHT SOURCE DEVICE INCLUDING PASSAGE FORMING MEMBER AND IMAGE PROJECTING APPARATUS HAVING THE SAME

(71) Applicants: Takehiro Nishimori, Kanagawa (JP); Kazuhiro Fujita, Tokyo (JP); Toshiharu Murai, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Tatsuya Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 38 days.

(21) Appl. No.: 14/444,124

(22) Filed: Jul. 28, 2014

(65) Prior Publication Data

US 2015/0042963 A1    Feb. 12, 2015

(30) Foreign Application Priority Data

Aug. 12, 2013   (JP) .................................. 2013-167398

(51) Int. Cl.
   *G03B 21/16*   (2006.01)
   *H04N 9/31*   (2006.01)
   *G03B 21/20*   (2006.01)

(52) U.S. Cl.
   CPC ............. *G03B 21/16* (2013.01); *G03B 21/204* (2013.01); *H04N 9/3111* (2013.01); *H04N 9/3144* (2013.01)

(58) Field of Classification Search
   CPC ... G03B 21/16; G03B 21/204; H04N 9/3144
   See application file for complete search history.

(56) References Cited

U.S. PATENT DOCUMENTS

| 8,157,398 B2* | 4/2012 | Yamamoto | G03B 21/204 353/38 |
| 8,337,027 B2* | 12/2012 | Ogura | G03B 21/14 353/31 |
| 8,354,790 B2* | 1/2013 | Iwanaga | G02B 26/008 313/501 |

(Continued)

FOREIGN PATENT DOCUMENTS

| CN | 1627181 A | 6/2005 |
| CN | 101498401 A | 8/2009 |

(Continued)

OTHER PUBLICATIONS

Chinese Office Action dated Sep. 6, 2015 issued in corresponding Chinese Application No. 201410379458.2.

(Continued)

*Primary Examiner* — Bao-Luan Le
(74) *Attorney, Agent, or Firm* — Harness, Dickey & Pierce, P.L.C.

(57) ABSTRACT

A light source device includes: a first light emitting unit including a light emitting element that emits light having a predetermined wavelength range; a second light emitting unit including a wavelength conversion member that receives the light from the light emitting element and emits light having a different wavelength range different than the predetermined wavelength range; an optical unit configured to define a path of the light emitted from the light emitting element and a path of the light emitted from the wavelength conversion member; an air blowing unit configured to generate a cooling air; and a passage forming member configured to form a passage through which the cooling air flows, the passage being in contact with both of the first light emitting unit and the second light emitting unit.

14 Claims, 5 Drawing Sheets

(56) References Cited

U.S. PATENT DOCUMENTS

| | | | | |
|---|---|---|---|---|
| 8,616,708 B2* | 12/2013 | Masuda | ............... | G03B 21/14 353/84 |
| 8,684,537 B2* | 4/2014 | Ogawa | ............... | G03B 21/20 353/31 |
| 8,814,366 B2* | 8/2014 | Sato | ............... | G02B 19/0057 353/85 |
| 9,039,255 B2* | 5/2015 | Kase | ............... | G03B 21/145 362/368 |
| 2005/0122721 A1 | 6/2005 | Hori | | |
| 2009/0284148 A1 | 11/2009 | Iwanaga | | |
| 2009/0290131 A1* | 11/2009 | Kim | ............... | G03B 21/16 353/61 |
| 2010/0245776 A1* | 9/2010 | Yamamoto | ............... | G03B 21/204 353/38 |
| 2010/0328617 A1* | 12/2010 | Masuda | ............... | G03B 21/14 353/31 |
| 2011/0051102 A1* | 3/2011 | Ogura | ............... | G03B 21/14 353/85 |
| 2011/0096296 A1* | 4/2011 | Ogawa | ............... | G03B 21/20 353/31 |
| 2012/0044465 A1 | 2/2012 | Murai et al. | | |
| 2012/0229780 A1* | 9/2012 | Sato | ............... | G02B 19/0057 353/85 |
| 2012/0293777 A1* | 11/2012 | Kase | ............... | G03B 21/145 353/85 |
| 2013/0038842 A1* | 2/2013 | Zakoji | ............... | G03B 21/2013 353/30 |
| 2013/0215397 A1 | 8/2013 | Matsubara | | |
| 2013/0308104 A1 | 11/2013 | Nishimori et al. | | |
| 2014/0028983 A1 | 1/2014 | Fujita et al. | | |
| 2014/0036241 A1 | 2/2014 | Nishimori et al. | | |
| 2014/0049755 A1 | 2/2014 | Nishimori et al. | | |
| 2014/0071407 A1 | 3/2014 | Takahashi et al. | | |
| 2014/0071408 A1 | 3/2014 | Takahashi et al. | | |
| 2014/0125956 A1 | 5/2014 | Chifu et al. | | |
| 2014/0204349 A1* | 7/2014 | Wu | ............... | G03B 21/204 353/84 |
| 2014/0240676 A1* | 8/2014 | Maes | ............... | G03B 21/204 353/20 |
| 2014/0340653 A1* | 11/2014 | Chifu | ............... | F21V 29/02 353/61 |
| 2015/0219183 A1* | 8/2015 | Utsunomiya | ............... | F16F 15/00 353/57 |

FOREIGN PATENT DOCUMENTS

| | | |
|---|---|---|
| CN | 101581410 A | 11/2009 |
| DE | 102008011866 A1 | 9/2009 |
| JP | 2000-348532 A | 12/2000 |
| JP | 2011-186350 | 9/2011 |
| JP | 2012-042735 | 3/2012 |
| JP | 2012-181431 | 9/2012 |
| WO | WO-2012/063322 A1 | 5/2012 |
| WO | WO-2013/008323 A1 | 1/2013 |

OTHER PUBLICATIONS

Extended European Search Report dated Mar. 10, 2015 issued in corresponding European Application No. 14179369.5.
U.S. Appl. No. 14/202,482, filed Mar. 10, 2014.
U.S. Appl. No. 14/153,196, filed Jan. 13, 2014.
U.S. Appl. No. 14/158,933, filed Jan. 20, 2014.
U.S. Appl. No. 14/202,422, filed Mar. 10, 2014.
U.S. Appl. No. 14/189,142, filed Feb. 25, 2014.

* cited by examiner

FIG. 7 though a micromirror display device that the image forming unit is not limited to those.

LIGHT SOURCE DEVICE INCLUDING PASSAGE FORMING MEMBER AND IMAGE PROJECTING APPARATUS HAVING THE SAME

CROSS-REFERENCE TO RELATED APPLICATIONS

This patent application is based on and claims priority pursuant to 35 U.S.C. §119 to Japanese Patent Application No. 2013-167398, filed on Aug. 12, 2013, in the Japan Patent Office, the entire disclosure of which is hereby incorporated by reference herein.

BACKGROUND

1. Technical Field

The present invention relates to a light source device and an image projecting apparatus having the same.

2. Description of the Related Art

The light source device may be used for a projector (image projecting apparatus) that projects a screen of a personal computer, a video image, or an image based on image data stored in a memory card, on a screen. Generally, the projector focuses light emitted from the light source device, on an image forming unit such as a micromirror display device referred to as a digital micromirror device (DMD) or a liquid crystal panel. In alternative to a high-luminance discharge lamp, the recent light source device may be implemented by a solid-state light emitting element that emits excitation light, and a phosphor (wavelength conversion member) that absorbs the excitation light and converts the excitation light into light having a predetermined wavelength range.

In the case where the light source device is applied to an image projecting apparatus requiring particularly high brightness, the disadvantage of an increase in temperature of the light emitting element becomes serious, such that the light emitting element needs to be cooled. Since the light is irradiated on the phosphor after the excitation light emitted by the light emitting element is focused to increase light density, large heat releasing occurs at a position corresponding to a focusing spot of the phosphor even in the case of a slight loss of light of the fluorescent material. In addition, in the case where the fluorescent material converts a wavelength of the excitation light, heat releasing occurs due to a loss. As a result, the heat releasing due to the loss of light and the heat releasing due to the loss during the wavelength conversion are combined, so that the temperature of the phosphor becomes very high. If the temperature of the phosphor becomes high, the material such as an organic binder included in the phosphor is degenerated, or an fluorescent light emission amount of the fluorescent material is decreased (temperature quenching), and as a result, there occurs a problem in that wavelength conversion efficiency of the phosphor is decreased. Thus, the phosphor also needs to be cooled.

SUMMARY

Example embodiments of the present invention include a light source device that includes: a first light emitting unit including a light emitting element that emits light having a predetermined wavelength range; a second light emitting unit including a wavelength conversion member that receives the light from the light emitting element and emits light having a different wavelength range different than the predetermined wavelength range; an optical unit configured to define a path of the light emitted from the light emitting element and a path of the light emitted from the wavelength conversion member; an air blowing unit configured to generate a cooling air; and a passage forming member configured to form a passage through which the cooling air flows, the passage being in contact with both of the first light emitting unit and the second light emitting unit.

Example embodiments of the present invention include an image projection apparatus, which includes the above-described light source device.

DETAILED DESCRIPTION OF THE INVENTION

Hereinafter, an embodiment where a light source device according to the present invention is used as a light source device of a projector as an image projecting apparatus will be described.

Figure 1:
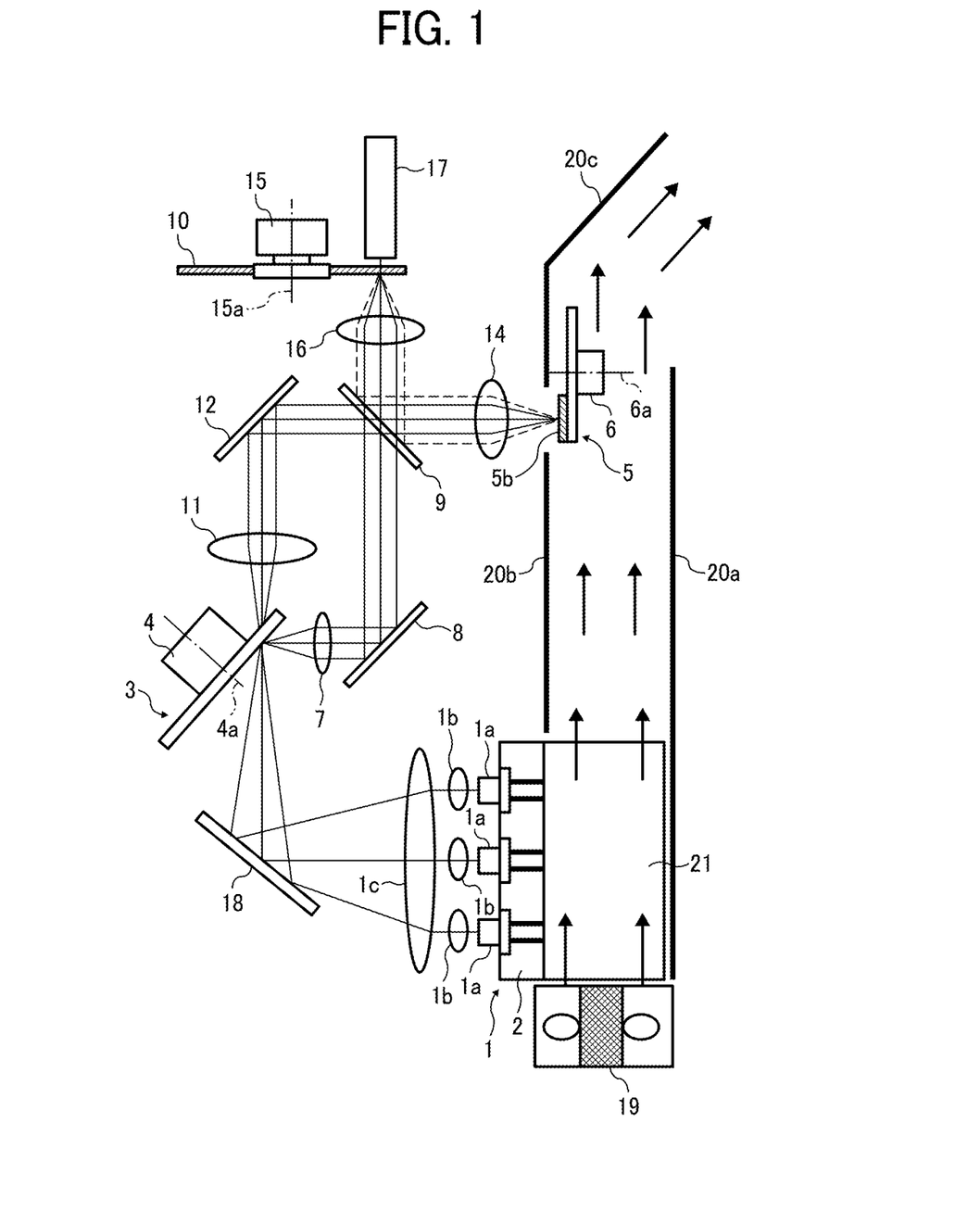
FIG. 1 is a schematic diagram illustrating a configuration of main parts of a light source device according to an embodiment of the present invention.

FIG. 1 is a schematic diagram illustrating a configuration of main parts of a light source device according to an example embodiment of the present invention.

The light source device mainly includes a light source unit 1 as a first light emitting unit, a phosphor wheel 5 as a second light emitting unit, and various optical units.

The light source unit 1 includes laser diodes 1a which are laser light sources as light emitting elements, coupling lenses 1b, and a condenser lens 1c. The plurality of the laser diodes 1a, and the coupling lenses 1b for the respective laser diodes 1a, are installed in a laser diode holder 2. Laser light from each laser diode 1a is focused by the corresponding coupling lens 1b and is guided as a parallel light flux to the condenser lens 1c. The condenser lens 1c serves a function of condensing the laser light which is formed as the parallel light flux by the respective coupling lenses 1b. In the embodiment, the laser diode 1a is described by exemplifying a blue laser light source which emits blue-component laser light. However, a laser light source which emits green-component laser light or red-component laser light may also be used. In addition, instead of the laser diode, other light sources such as an LED may also be used.

The blue-component laser light condensed by the condenser lens 1c is reflected by a reflecting mirror 18 and is guided to an optical path switching disc 3 which is an optical path switching member. The spot size of the laser light irradiated on the optical path switching disc 3 is determined as a size which is appropriate for preventing color mixture or the like.

Figure 2:
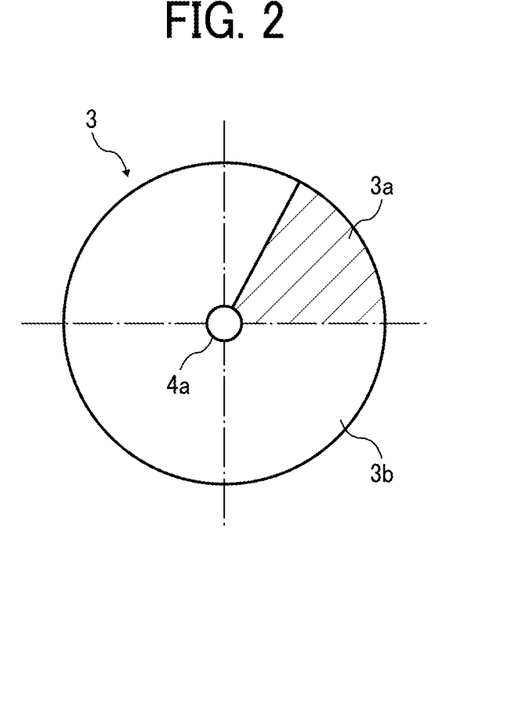
FIG. 2 is a schematic plan diagram illustrating a configuration of an optical path switching disc in the light source device of FIG. 1.

FIG. 2 is a schematic plan diagram illustrating a configuration of the optical path switching disc 3.

As illustrated in FIG. 2, the optical path switching disc 3 is implemented by a rotary disc for time division of optical paths, where a reflecting region 3a and a transmitting region 3b are divided in the rotational direction. The optical path switching disc 3 is configured so that the disc surface thereof is arranged with a slope (herein, 45 degrees with respect to the optical axis) with respect to the optical axis of the blue-component laser light which is incident from the reflecting mirror 18. As illustrated in FIG. 1, the optical path switching disc 3 is driven by a step motor 4 as a driving source to rotate about a rotation shaft 4a.

The reflecting region 3a of the optical path switching disc 3 is configured so that a reflection film is formed at the disc surface side which is hit by the blue-component laser light. In addition, the transmitting region 3b of the optical path switching disc 3 is configured so that an antireflection film is formed at the disc surface side which is hit by the blue-component laser light and the surface at the opposite side of the antireflection film is formed as a diffusion surface. The diffusion surface is formed so as to remove speckle of the laser light. In addition, instead of the configuration where the diffusion surface is arranged on the optical path switching disc 3, a rotary diffusion plate may be arranged.

The blue-component laser light which transmits through the transmitting region 3b of the optical path switching disc 3 is guided to the phosphor wheel 5 by a condenser lens 11, a reflecting mirror 12, a dichroic mirror 9, and a condenser lens 14. The condenser lens 11 has a function of condensing the blue-component laser light transmitted by the transmitting region 3b and converting the blue-component laser light into a parallel light flux. The dichroic mirror 9 has a function of transmitting the blue-component laser light to guide the blue-component laser light to the phosphor wheel 5 and a function of reflecting fluorescent light having color components excluding the blue component and guiding the fluorescent light to a color component switching disc 10 as a color component switching unit. The condenser lens 14 has a function of condensing the parallel light flux in a spot shape to the phosphor wheel 5 and a function of condensing the fluorescent light from the phosphor wheel 5 and converting the fluorescent light into a parallel light flux.

The phosphor wheel 5 is configured with a rotary disc and is driven by a step motor 6 as a driving source to rotate about a rotation driving shaft 6a. The phosphor wheel 5 is applied with a fluorescent film 5b which is irradiated with the blue-component laser light emitted from the light source unit 1 to generate fluorescent light including the green-component fluorescent light and the red-component fluorescent light, of which color components are different from the blue component. Due to the rotation of the phosphor wheel 5, continuous irradiation of the laser light on the same position is prevented, so that deterioration of the fluorescent film 5b is suppressed. For a fluorescent material of the fluorescent film 5b, for example, a mixture (a fluorescent material generating yellow fluorescent light) of a fluorescent material which is excited by irradiation of blue-component laser light to generate green-component fluorescent light and a fluorescent material which is excited in the same manner to red-component fluorescent light may be used, but the present invention is not limited thereto. For example, a fluorescent material having a fluorescent light distribution characteristic covering a wavelength range from a wavelength range of the green component to a wavelength range of the red component may be used.

The blue-component laser light which transmits through the transmitting region 3b of the optical path switching disc 3 transmits through the dichroic mirror 9 and is irradiated on the phosphor wheel 5. As a result, the phosphor wheel 5 generates fluorescent light including the green component and the red component. When the green-component fluorescent light and the red-component fluorescent light generated in this manner is incident on the dichroic mirror 9, the fluorescent light is reflected by the dichroic mirror 9 and is condensed by the condenser lens 16 to be guided to the color component switching disc 10.

Figure 3:
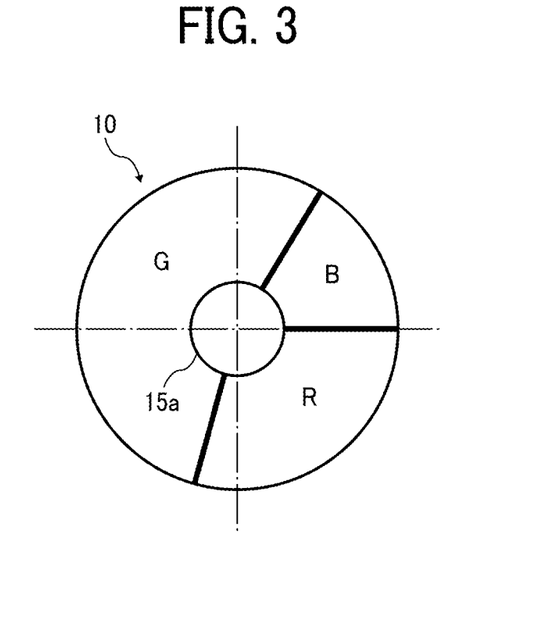
FIG. 3 is a schematic plan diagram illustrating a configuration of a color component switching disc in the light source device of FIG. 1.

FIG. 3 is a schematic plan diagram illustrating a configuration of the color component switching disc 10.

The color component switching disc 10 is implemented by a rotary disc and is driven by a step motor 15 as a driving source to rotate about a rotation shaft 15a. As illustrated in FIG. 3, the color component switching disc 10 is implemented by a rotary disc for time division of color components, where a first region transmitting the blue-component light, a second region transmitting the green-component fluorescent light and absorbing or reflecting the red-component fluorescent light, and a third region transmitting the red-component fluorescent light and absorbing or reflecting the green-component fluorescent light are formed in a rotational direction by division in the rotational direction. In the color component switching disc 10, the region transmitting the blue component may be configured with, for example, a transparent glass plate or a notch portion. However, the region may be configured with a filter that transmits only light having a specific wavelength range including the wavelength range of the blue component.

When the fluorescent light including the green and red components which are emitted from the phosphor wheel 5 to be guided to the color component switching disc 10 transmits through the second region of the color component switching disc 10, the red component is cut off, and only the green-component light passes through the color component switching disc 10 to be guided to a light tunnel 17. In addition, when the fluorescent light including the green and red components which are guided to the color component switching disc 10 transmits through the third region of the color component switching disc 10, the green component is cut off, and only the red-component light passes through the color component switching disc 10 to be guided to the light tunnel 17.

On the other hand, the blue-component laser light which is reflected by the reflecting region 3a of the optical path switching disc 3 is converted into a parallel light flux by the condenser lens 7 and is reflected by a reflecting mirror 8 to be guided to the dichroic mirror 9. Since the dichroic mirror 9 has the function of transmitting the blue-component laser light as described above, the blue-component laser light reflected by the reflecting mirror 8 transmits through the dichroic mirror 9 and is condensed by the above-described condenser lens 16, and after that, the blue-component laser light is guided to the color component switching disc 10. The blue-component laser light guided in this manner transmits through the first region of the color component switching disc 10 to be guided to the light tunnel 17.

The light tunnel 17 serves a function of reducing non-uniformity of light amount. Instead of the light tunnel 17, other members such as a fly eye lens can also be used. The light guided to the light tunnel 17 is guided by the light tunnel 17 to be irradiated outward from the light source device.

Next, a cooling unit of the light source device will be described.

In the light source unit 1 of the light source device according to the embodiment, a heat sink (heat dissipation plate) 21 as a light emitting element heat dissipation member for dissipating heat generated by the laser diodes 1a is installed at the rear surface side of the laser diode holder 2. The heat sink 21 is configured with a metal such as aluminum or copper. In addition, an axial flow fan 19 as an air blowing unit is installed in the vicinity of the heat sink 21 and is configured so that air is blown from the axial flow fan 19 to the heat sink 21.

The heat generated by the laser diodes 1a is transferred to the heat sink 21. When the cooling air blown out from the axial flow fan 19 passes by the heat sink 21, the cooling air draws the heat from the heat sink 21. Since the heat generated by the laser diodes 1a can be effectively removed in this manner, it is possible to suppress an increase in temperature of the laser diodes 1a.

As indicated by arrows in FIG. 1, an exhausted air of the heat sink 21, which is blown out from the axial flow fan 19 and passes through the heat sink 21, is guided through an air-exhaustion passage, which is formed by air-exhaustion passage members 20a, 20b, and 20c as passage forming members, to the phosphor wheel 5. In the embodiment, since the phosphor wheel 5 is disposed inside the air-exhaustion passage, when the exhausted air of the heat sink 21 flowing along the air-exhaustion passage passes by the phosphor wheel 5, the exhausted air takes the heat away by absorbing the heat generated from the phosphor wheel 5. The exhausted air which passes by the phosphor wheel 5 is discharged through an outlet arranged in the vicinity of the phosphor wheel 5 outward from the light source device.

Herein, in order to effectively cool the phosphor wheel 5, the temperature of the exhausted air from the heat sink 21 should be sufficiently low to be able to take the heat generated by the phosphor wheel 5 away from the phosphor wheel 5. In view of this, in the embodiment, a material of the heat sink 21 or a heat dissipation surface area may be determined, or an air flow rate of the axial flow fan 19 may be determined, according to a released heat amount generated by the laser diodes 1a installed in the light source unit 1. With this configuration, the temperature of the exhausted air from the heat sink 21 is regulated to be low enough to be able to take the heat generated by the phosphor wheel 5 away from the phosphor wheel 5. Due to the optimization of the settings of the heat sink 21 or the axial flow fan 19 in this manner, a large temperature difference occurs between the temperature of the exhausted air from the heat sink 21 and the surface temperature of the phosphor wheel 5, so that it is possible to effectively cool the phosphor wheel 5.

In addition, since the embodiment has a configuration where the phosphor wheel 5 itself is driven to rotate and, thus, the surface of the phosphor wheel 5 is moved, in comparison with a configuration where the surface of the phosphor wheel 5 is not moved, the air flow which is in contact with the surface of the phosphor wheel 5 has a relatively high speed. Therefore, the cooling effect due to the rotation driving of the phosphor wheel 5 is added, so that it is possible to effectively cool the phosphor wheel 5.

In addition, in the embodiment, since a portion of the air-exhaustion passage between the heat sink 21 and the phosphor wheel 5 of the light source unit 1 is formed in a shape of a straight line, the cooling air blown out from the axial flow fan 19 can be configured so as to pass through the heat sink 21 and the phosphor wheel 5 with a low loss of pressure. Therefore, the air can be discharged in the state where both of the heat of the heat sink 21 and the heat of the phosphor wheel 5 are effectively taken away. Therefore, according to the embodiment, the phosphor wheel 5 may be sufficiently cooled without addition of a dedicated cooling fan for the phosphor wheel 5, so that it is possible to suppress an increase in size, cost, and noise of the light source device.

Modified Example 1

Next, a modified example (hereinafter, referred to as "Modified Example 1") of the light source device according to the embodiment will be described.

Figure 4:
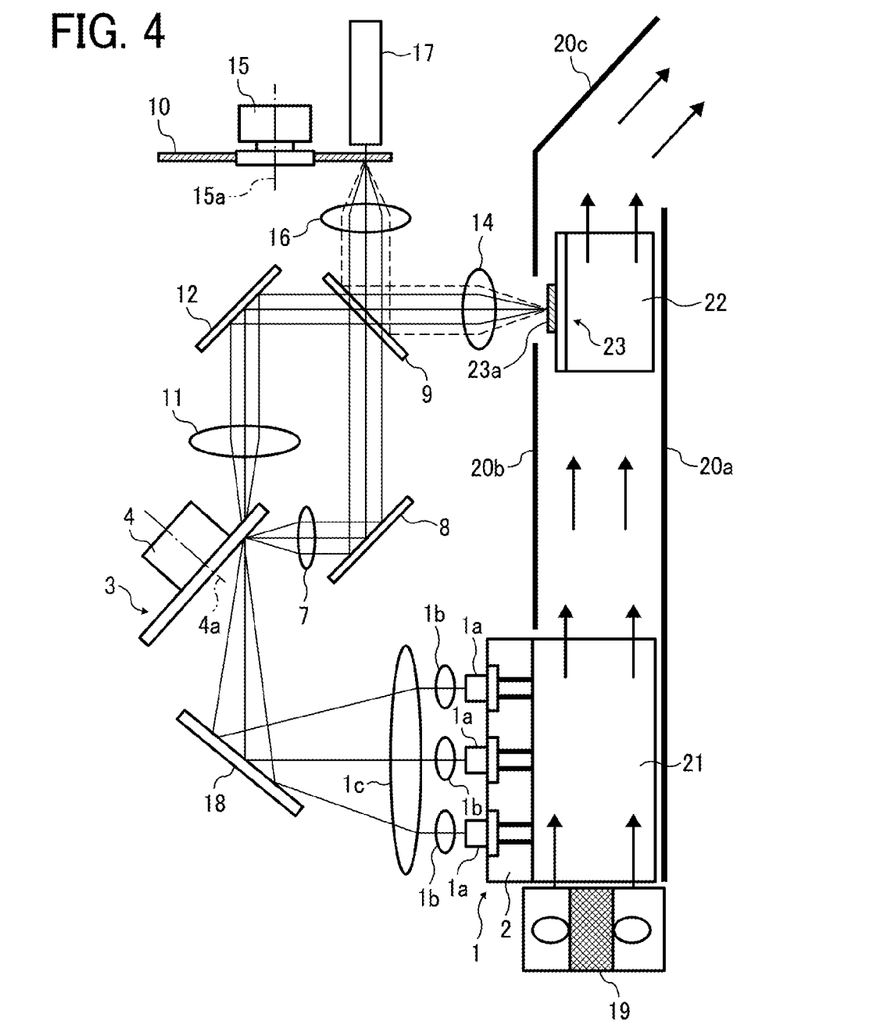
FIG. 4 is a schematic diagram illustrating a configuration of main parts of a light source device according to an example embodiment of the present invention.

In Modified Example 1, a fixed phosphor 23 which is fixed in a stationary state is arranged instead of the phosphor wheel 5 of the light source device according to the embodiment. In addition, since the basic configuration of Modified Example 1 is the same as that of the above-described embodiment, hereinafter, the points different from the above-described embodiment will be mainly described.

FIG. 4 is a schematic diagram illustrating a configuration of main parts of the light source device according to Modified Example 1.

Figure 5:
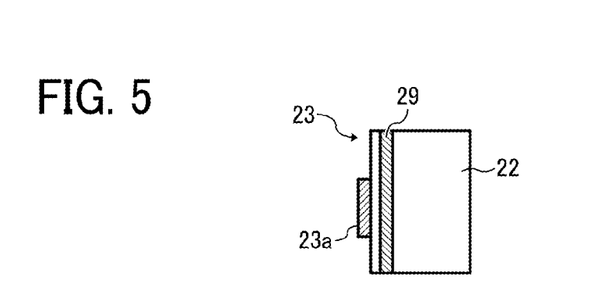
FIG. 5 is a schematic diagram illustrating a configuration of a fixed phosphor of the light source device of FIG. 4.

In Modified Example 1, a surface of the fixed phosphor 23 is applied with a fluorescent film 23a which is irradiated with the blue-component laser light emitted from the light source unit 1 to generate fluorescent light including the green-component fluorescent light and the red-component fluorescent light, of which color components are different from the blue component. As illustrated in FIG. 5, a heat sink 22 as a phosphor heat dissipation member is installed on the rear surface of the fixed phosphor 23. The material or surface area of the heat sink 22 is appropriately set so as to sufficiently dissipate the heat transferred from the fixed phosphor 23 by using the exhausted air from the heat sink 21 of the light source unit 1.

A heat conducting sheet 29 as a heat conducting member is inserted between the fixed phosphor 23 and the heat sink 22. Since the heat conducting sheet 29 has a high heat conductivity, the heat conducting sheet 29 can effectively transfer the heat generated by the fluorescent film 23a on the fixed phosphor 23 to the heat sink 22.

As indicated by arrows in FIG. 4, the exhausted air which is blown out from the axial flow fan 19 and passes by the heat sink 21 of the light source unit 1, is guided through the air-exhaustion passage, which is formed by the air-exhaustion passage members 20a, 20b, and 20c, to the fixed phosphor 23. In Modified Example 1, the fixed phosphor 23 and the heat sink 22 therefor are disposed inside the air-exhaustion passage. Therefore, the exhausted air of the heat sink 21 of the light source unit 1 flowing along the air-exhaustion passage flows in the state where the exhausted air is in contact with the fluorescent film 23a on the fixed phosphor 23, so that the exhausted air directly takes the heat away from the fluorescent film 23a. At the same time, when the exhausted air passes by the heat sink 22, the exhausted air absorbs the heat from the heat sink 22, so that the exhausted air indirectly takes the heat away from the fluorescent film 23a. Since the heat generated by the fluorescent film 23a on the fixed phosphor 23 may be effectively removed in this manner, it is possible to suppress an increase in temperature of the fluorescent film 23a.

Herein, since Modified Example 1 has a configuration where the surface of the fixed phosphor 23 is not moved, it is possible to obtain the cooling effect due to the surface movement of the phosphor wheel 5. However, since Modified Example 1 has the configuration where the heat sink 22 is arranged for the fixed phosphor 23 by using the heat conducting sheet 29 and is disposed inside the air-exhaustion passage, although the surface of the fixed phosphor 23 is not moved, it is possible to implement a sufficiently high cooling effect.

In addition, since the above-described embodiment has the configuration where the phosphor wheel 5 is driven to rotate, a driving source for the rotation driving, a rotation detecting sensor for detecting abnormal stoppage or the like of the rotation driving, and the like needs to be arranged. According to Modified Example 1, since such a driving source, a rotation detecting sensor, and the like do not need to be arranged, it is possible to implement a low-cost, low-noise configuration.

Modified Example 2

Next, another modified example (hereinafter, referred to as "Modified Example 2") of the light source device according to the embodiment will be described.

Figure 6:
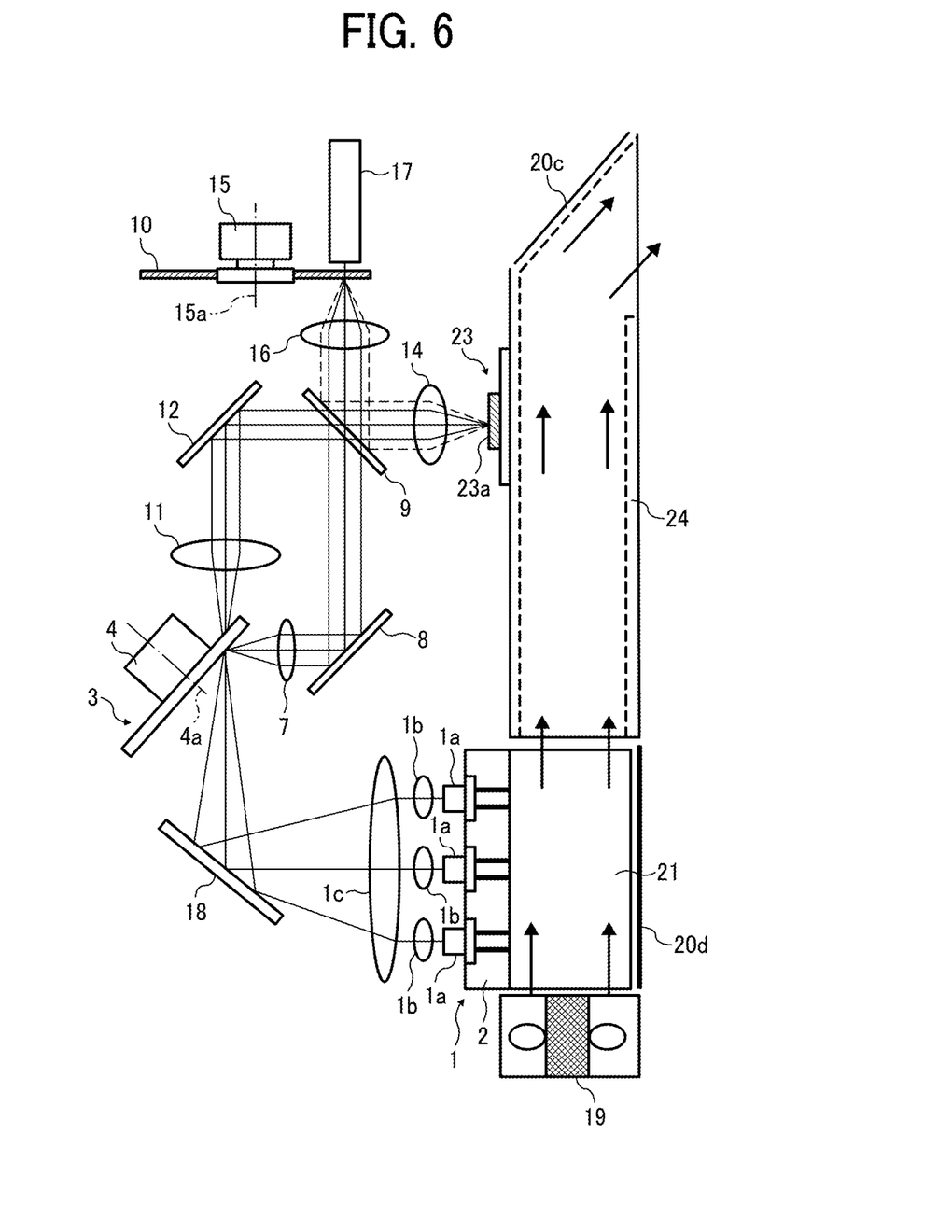
FIG. 6 is a schematic diagram illustrating a configuration of main parts of a light source device according to an example embodiment of the present invention.

Similarly to the above-described Modified Example 1, in Modified Example 2, a fixed phosphor 23 which is fixed in a stationary state is arranged instead of the phosphor wheel 5 of the light source device according to the embodiment. However, Modified Example 2 is different from Modified Example 1 in that the heat sink 22 of the Modified Example 1 is not arranged, but the fixed phosphor 23 is arranged on a heat-dissipation/air-exhaustion passage member 24 which is a passage forming member. Since the basic configuration of Modified Example 2 is the same as that of Modified Example 1, hereinafter, the points different from Modified Example 1 will be mainly described.

FIG. 6 is a schematic diagram illustrating a configuration of main parts of the light source device according to Modified Example 2.

As indicated by arrows in FIG. 6, in Modified Example 2, the air-exhaustion passage where the exhausted air of the heat sink 21, which is blown out from the axial flow fan 19 and passes by the heat sink 21 flows, is formed by the heat-dissipation/air-exhaustion passage member 24 as a passage forming member. The heat-dissipation/air-exhaustion passage member 24 is configured with a metal plate having a high heat conductivity. In Modified Example 2, the fixed phosphor 23 is disposed on an outer wall of the heat-dissipation/air-exhaustion passage member 24. Therefore, the heat generated by the fluorescent film 23a on the fixed phosphor 23 is transferred to the entire heat-dissipation/air-exhaustion passage member 24.

As indicated by arrows in FIG. 6, the air-exhaustion passage where the exhausted air of the heat sink 21, which is blown out from the axial flow fan 19 and passes by the heat sink 21 of the light source unit 1, is guided through an air-exhaustion passage to an outlet which is formed by cutting at least a portion of an inner wall of the heat-dissipation/air-exhaustion passage member 24. At this time, in Modified Example 2, the exhausted air of the heat sink 21 of the light source unit 1 flowing along the air-exhaustion passage flows in the state where the exhausted air is in contact with the inner wall of the heat-dissipation/air-exhaustion passage member 24, so that the exhausted air takes the heat away from the heat-dissipation/air-exhaustion passage member 24. The surface area of the inner wall of the heat-dissipation/air-exhaustion passage member 24 may be easily increased so as to be larger than the surface area of the heat sink 22 of Modified Example 1, without an increase in size of the light source device. Therefore, it is possible to effectively remove the heat generated by the fluorescent film 23a on the fixed phosphor 23, thus suppressing an increase in temperature of the fluorescent film 23a. In addition, since the passage forming member is also used as the heat dissipation member of the fixed phosphor 23, in comparison with the case where such a member is separately configured, the number of parts becomes small, so that it is possible to implement a lower-cost, simple configuration.

Next, a configuration and operations of a projector as an image projecting apparatus equipped with the light source device of FIG. 1 according to the embodiment will be described.

In alternative to the light source device of FIG. 1, the light source device according to Modified Example 1 or 2 (FIG. 4 or 6) may also be used as the light source device.

Figure 7:
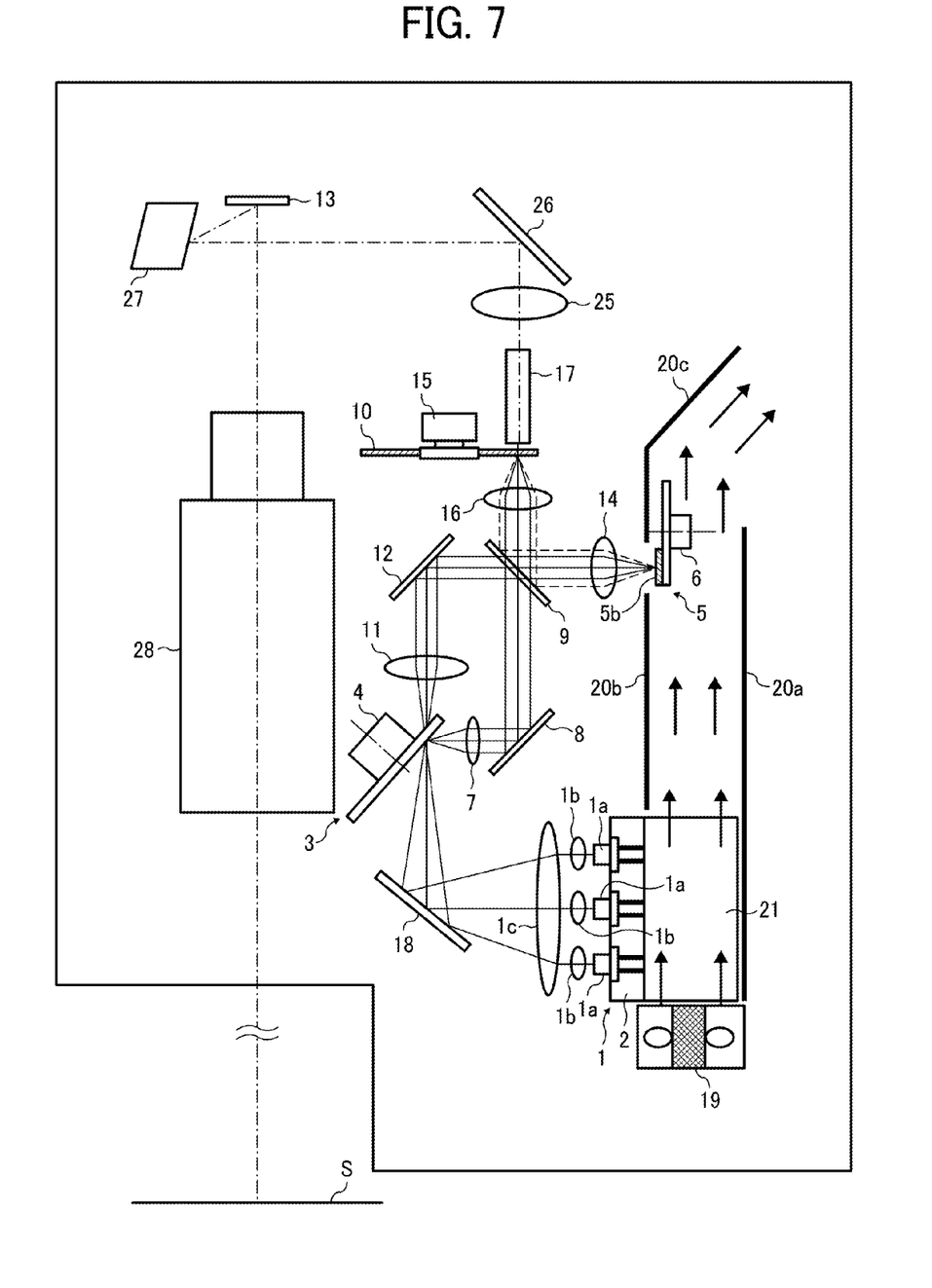
FIG. 7 is a schematic diagram illustrating an example of a projector using the light source device of FIG. 1.

FIG. 7 is a schematic diagram illustrating an example of the projector using the light source device according to the embodiment.

After the light passing through the light tunnel 17 of the light source device is converted into a parallel light flux by a condenser lens 25 constituting the illumination optical system, the light is reflected by reflecting mirrors 26 and 27 constituting the illumination optical system to be guided to an image forming panel 13 as an image forming member. The image forming panel 13 is controlled by any desired image generating unit, so that light of each color component is reflected by the image forming panel 13 to be irradiated on a screen S through a projecting lens unit 28 constituting a projection optical system. As a result, a color image is magnified and displayed on the screen S.

In the projector according to the embodiment, a transmission type panel where an image is formed according to a modulation signal is exemplified as the image forming panel 13. However, a reflection type panel or a digital micromirror device (DMD) type panel may be used. In addition, the light tunnel 17 is a representative example of a light intensity uniformization unit, and other well-known light intensity uniformization units may be used.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

In a light source device, a first light emitting unit and a second light emitting unit are provided. The first light emitting unit may be implemented by a light source unit 1, which includes a light emitting element such as a laser diode 1a that emits light (blue-component light) having a predetermined wavelength range of about 450 [nm] or more and about 495 [nm] or less. The second light emitting unit may be implemented by a phosphor wheel 5 or a fixed phosphor 23, which includes a wavelength conversion member such as a fluorescent film 5b or a fluorescent film 23a which emits light (light having color components of from green component to red component) having a different wavelength range of, for example, about 495 [nm] or more and 750 [nm] or less which is different from the predetermined wavelength range. The light source device further includes an optical unit such as various lenses, mirrors, and an optical path switching disc 3, and an air blowing unit. The optical unit defines a path of the light emitted from the light emitting element and a path of the light emitted from the wavelength conversion member. The air blowing unit may be implemented by an axial flow fan 19 that generates a cooling air. The light source device further includes a passage forming member such as air-exhaustion passage members 20a, 20b, and 20c or a heat-dissipation/air-exhaustion passage member 24, which forms the passage through which the cooling air flows. The passage is made in contact with both of the first light emitting unit and the second light emitting unit.

Accordingly, both of the light emitting element of the first light emitting unit and the wavelength conversion member of the second light emitting unit may be cooled by the cooling air generated by the air blowing unit, in comparison with a configuration where the light emitting element and the wavelength conversion member are cooled by separate air blowing units. With this configuration, the wavelength conversion member and the light emitting element are cooled, while suppressing an increase in size of the device.

In the above-described light source device, at least a portion of the passage between the first light emitting unit and the second light emitting unit is formed in a shape of a straight line. Accordingly, the cooling air blown out from the air blowing unit may be allowed to be in contact with the first light emitting unit and the second light emitting unit with a low loss of pressure. This can effectively cool both of the light emitting element of the first light emitting unit and the wavelength conversion member of the second light emitting unit.

In the above-described light source device, the optical unit further includes reflecting mirrors 12 and 18 or the like, which reflects the light from the light emitting element of the first light emitting unit to the wavelength conversion member of the second light emitting unit. Accordingly, the first light emitting unit and the second light emitting unit may be easily arranged in a shape of a straight line.

In the above-described light source device, the cooling air flows inside the passage from the first light emitting unit toward the second light emitting unit. Generally, in many cases, it is desired that the cooling effect for the light emitting element of the first light emitting unit is higher than the cooling effect for the wavelength conversion member of the second light emitting unit. Since the heat of the first light emitting unit is drawn by the cooling air prior to the second light emitting unit, in comparison with the case where the heat of the second light emitting unit is drawn by the cooling air prior to the first light emitting unit, the temperature of the cooling air which is in contact with the first light emitting unit becomes low, such that a higher cooling effect can be obtained.

In the light source device, the first light emitting unit includes a light emitting element heat dissipation member such as a heat sink 21 disposed inside the passage to dissipate heat of the light emitting element. This can effectively cool the light emitting element of the first light emitting unit.

In the above-described light source unit, the wavelength conversion member is a phosphor which emits the light having the different wavelength range, based on the light from the light emitting element as excitation light. Accordingly, the light having a wavelength range different from that of the light emitted by the light emitting element can be generated with a simple configuration.

In one example, the light source device further includes a surface moving unit such as a step motor 6 that moves a surface of the phosphor so as to change a surface portion of the phosphor receiving the light from the light emitting element. Accordingly, continuous irradiation of the light from the light emitting element on the same position of the surface of the phosphor is prevented, so that deterioration of the phosphor is suppressed. In addition, due to the movement of the surface of the phosphor, in comparison with the configuration where the surface of the phosphor is not moved, the air which is in contact with the surface of the phosphor has a relatively high speed, thus achieving the higher cooling effect.

In one example, the phosphor is arranged to be fixed. Accordingly, a driving source, a sensor, and the like required for moving the surface of the phosphor do not need to be arranged, thus achieving a low-cost, low-noise configuration.

In the above-described light source, the second light emitting unit includes a phosphor heat dissipation member such as a heat sink 22 disposed inside the passage to dissipate heat of the phosphor. This can effectively cool the phosphor of the second light emitting unit.

In the above-described light source, a heat conducting member such as a heat conducting sheet 29 is interposed between the phosphor and the phosphor heat dissipation member. This can effectively transfer the heat generated by the phosphor to the phosphor heat dissipation member, thus, effectively cooling the phosphor of the second light emitting unit.

In the above-described light source, at least a portion of the passage forming member may be formed as the phosphor heat dissipation member. Accordingly, in comparison with the case where a heat sink or the like is used as the phosphor heat dissipation member, a phosphor heat dissipation member having a wide surface area may be easily formed without an increase in size of the device, thus achieving a high cooling effect. In addition, since the passage forming member is also used as the phosphor heat dissipation member, in comparison with the case where such a member is separately configured, the number of parts becomes small, thus achieving a low-cost, simple configuration.

In the light source unit, the predetermined wavelength range is a wavelength range of blue component (wavelength range of about 450 [nm] or more and about 495 [nm] or less), and the different wavelength range is a wavelength range of from green component to blue component (wavelength of about 495 [nm] or more and about 750 [nm] or less). This can easily implement a light source device which radiates light of three primary colors required for a color image.

Example embodiments of the present invention may include an image projecting apparatus such as a projector, which includes any one of the above-described light source devices, an illumination optical system such as a condenser lens 25 and reflecting mirrors 26 and 27 which transmits light emitted from the light source device to an image forming member such as an image forming panel 13, and a projection optical system such as a projecting lens unit 28 which magnifies and projects an image formed on the image forming member. With this configuration, the wavelength conversion member and the light emitting element of the light source apparatus are cooled, while suppressing an increase in size of the light source device, thus, suppressing an increase in size of the image projecting apparatus.

What is claimed is:
1. A light source device comprising:
  a first light emitting unit including a light emitting element configured to emit light having a first wavelength range;
  a second light emitting unit including a wavelength conversion member configured to receive the light from the light emitting element and emit light having a second wavelength range that is different than the first wavelength range;

an optical unit configured to define a path of the light emitted from the light emitting element and a path of the light emitted from the wavelength conversion member;

an air blowing unit configured to generate cooling air; and a passage forming member configured to form a passage through which the cooling air flows along an inner wall of the passage forming member to cool both of the first light emitting unit and the second light emitting unit, wherein, the passage forming member includes a metal, and the second light emitting unit is on an outer wall of the passage forming member, the outer wall being a reverse side of the inner wall.

2. The light source device according to claim 1, wherein the passage forming member forms at least a portion of the passage between the first light emitting unit and the second light emitting unit so as to have a shape of a straight line.

3. The light source device according to claim 2, wherein the optical unit includes:

a reflector configured to reflect the light from the light emitting element of the first light emitting unit toward the wavelength conversion member of the second light emitting unit.

4. The light source device according to claim 1, wherein the first light emitting unit includes:

a light emitting element heat dissipation member disposed inside the passage and configured to dissipate heat of the light emitting element.

5. The light source device according to claim 1, wherein the wavelength conversion member includes a phosphor that emits the light having the second wavelength range based on the light received from the light emitting element as excitation light.

6. The light source device according to claim 5, wherein the phosphor is fixed.

7. The light source device according to claim 1,
wherein the first wavelength range is a wavelength range that includes a blue component, and
wherein the second wavelength range is a wavelength range ranging from a green component to a red component.

8. An image projecting apparatus comprising:
the light source device according to claim 1;
an illumination optical system configured to transmit the light emitted from the light source device to an image forming member to form an image thereon; and
a projection optical system configured to project the image formed on the image forming member on a projection surface.

9. The light source device according to claim 1, wherein the first light emitting unit is upstream of the second light emitting unit with respect to a flow direction of the cooling air through the passage.

10. The light source device according to claim 1, wherein the first light emitting unit is between the second light emitting unit and the air blowing unit.

11. The light source device according to claim 1, wherein cooling air heated by the first light emitting unit cools the second light emitting unit.

12. The light source device according to claim 1, wherein the first light emitting unit includes a heat sink, the heat sink being of a material and size that achieves a desired temperature for cooling air that is heated by the heat sink and cools the second light emitting unit.

13. The light source device according to claim 1, wherein the first light emitting unit and the second light emitting unit emit light in a direction that is perpendicular to a direction in which the passage extends.

14. A light source device comprising:
a first light emitting unit including a light emitting element configured to emit light having a first wavelength range;
a second light emitting unit including a wavelength conversion member configured to receive the light from the light emitting element and emit light having a second wavelength range that is different than the first wavelength range;
an air blowing unit configured to generate cooling air; and
a passage forming member configured to form a passage through which the cooling air flows along an inner wall of the passage forming member to cool both of the first light emitting unit and the second light emitting unit, wherein,
the second light emitting unit is on an outer wall of the passage forming member, the outer wall being a reverse side of the inner wall.

* * * * *